W. M. SCOTT.
ELECTRIC CONTROL APPARATUS.
APPLICATION FILED FEB. 14, 1916.

1,235,932.

Patented Aug. 7, 1917.
3 SHEETS—SHEET 1.

Witnesses
C. Russell Ellis
James H. Wyatt

Inventor
William M. Scott
By Cornelius D. Ehret
His Attorney

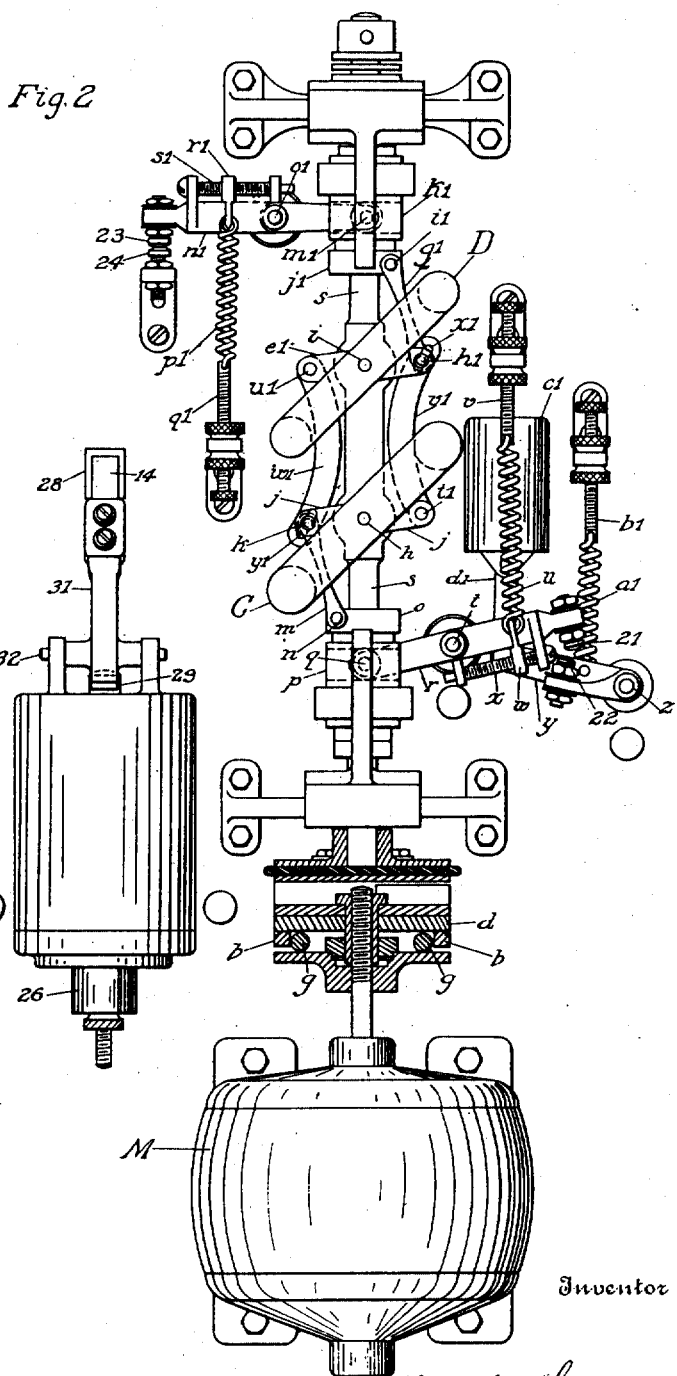

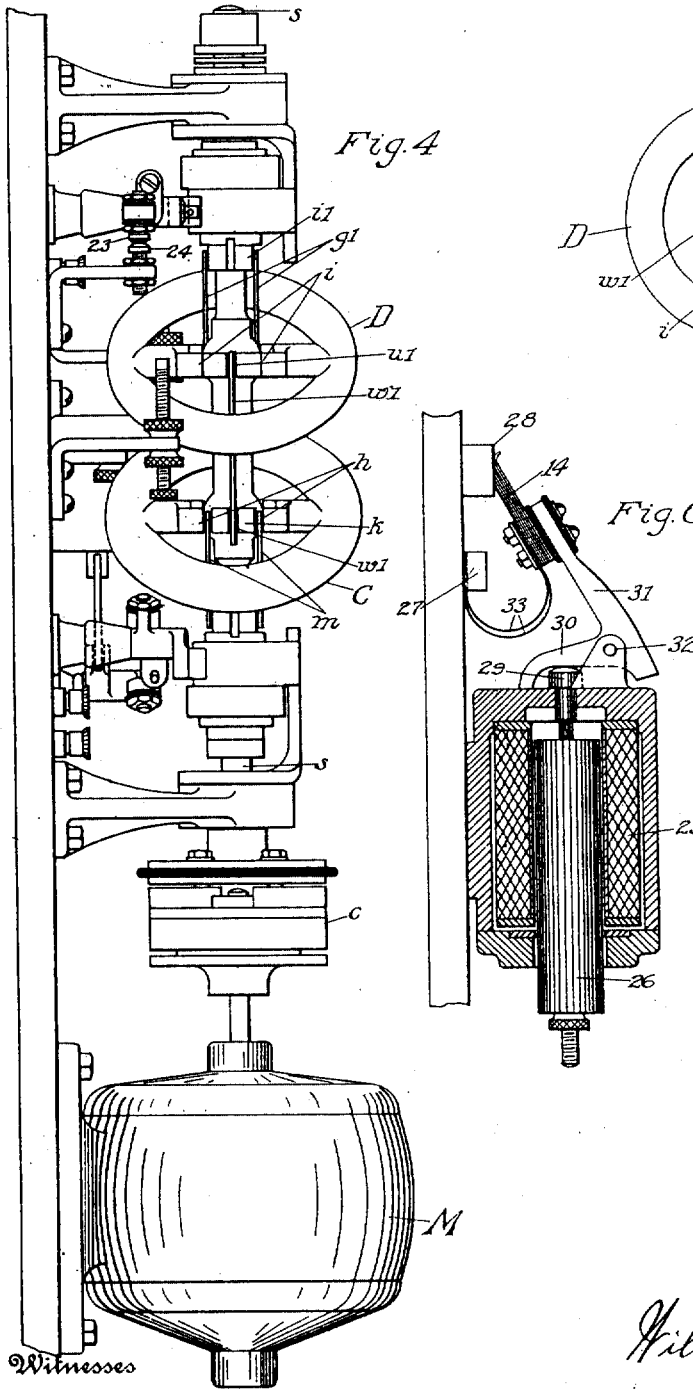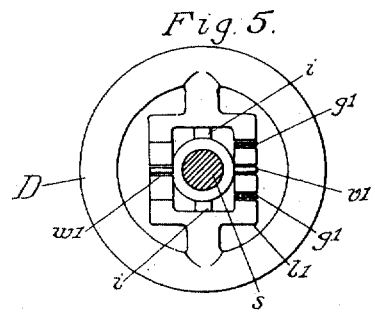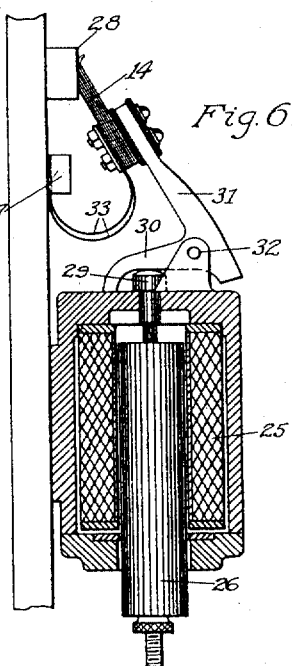

UNITED STATES PATENT OFFICE.

WILLIAM M. SCOTT, OF TREDYFFRIN TOWNSHIP, CHESTER COUNTY, PENNSYLVANIA.

ELECTRIC CONTROL APPARATUS.

1,235,932.      Specification of Letters Patent.      Patented Aug. 7, 1917.

Application filed February 14, 1916. Serial No. 78,322.

*To all whom it may concern:*

Be it known that I, WILLIAM M. SCOTT, a citizen of the United States, residing in Tredyffrin township, in the county of Chester and State of Pennsylvania, have invented a new and useful Electric Control Apparatus, of which the following is a specification.

My invention relates to speed responsive means for controlling switching mechanism which in turn controls any suitable circuit or circuits or translating device which in turn may be utilized for actuating or controlling any suitable mechanism such as electric switching mechanism. And the speed to which said controlling mechanism is responsive may reflect or be dependent upon an electrical condition of a circuit or the relation of electrical conditions of circuits as, for example, the difference between the voltages of a plurality of circuits, which circuits may be controlled as to their coaction by switching mechanism controlled or actuated by the aforementioned translating device.

More specifically my invention resides in a system of control wherein a generator may be switched into circuit or in parallel with another generator or source of current only when the voltage of the incoming generator bears a certain relation to the voltage of the generator or source of current into whose circuit it is to be switched, and more particularly when the voltage difference between the two circuits predominates in a predetermined direction and lies within predetermined limits.

For an illustration of one of many embodiments of my invention reference may be had to the accompanying drawings, in which:

Fig. 2 is a front elevational view of switching mechanism responsive to speed conditions together with associated apparatus.

Figure 1:
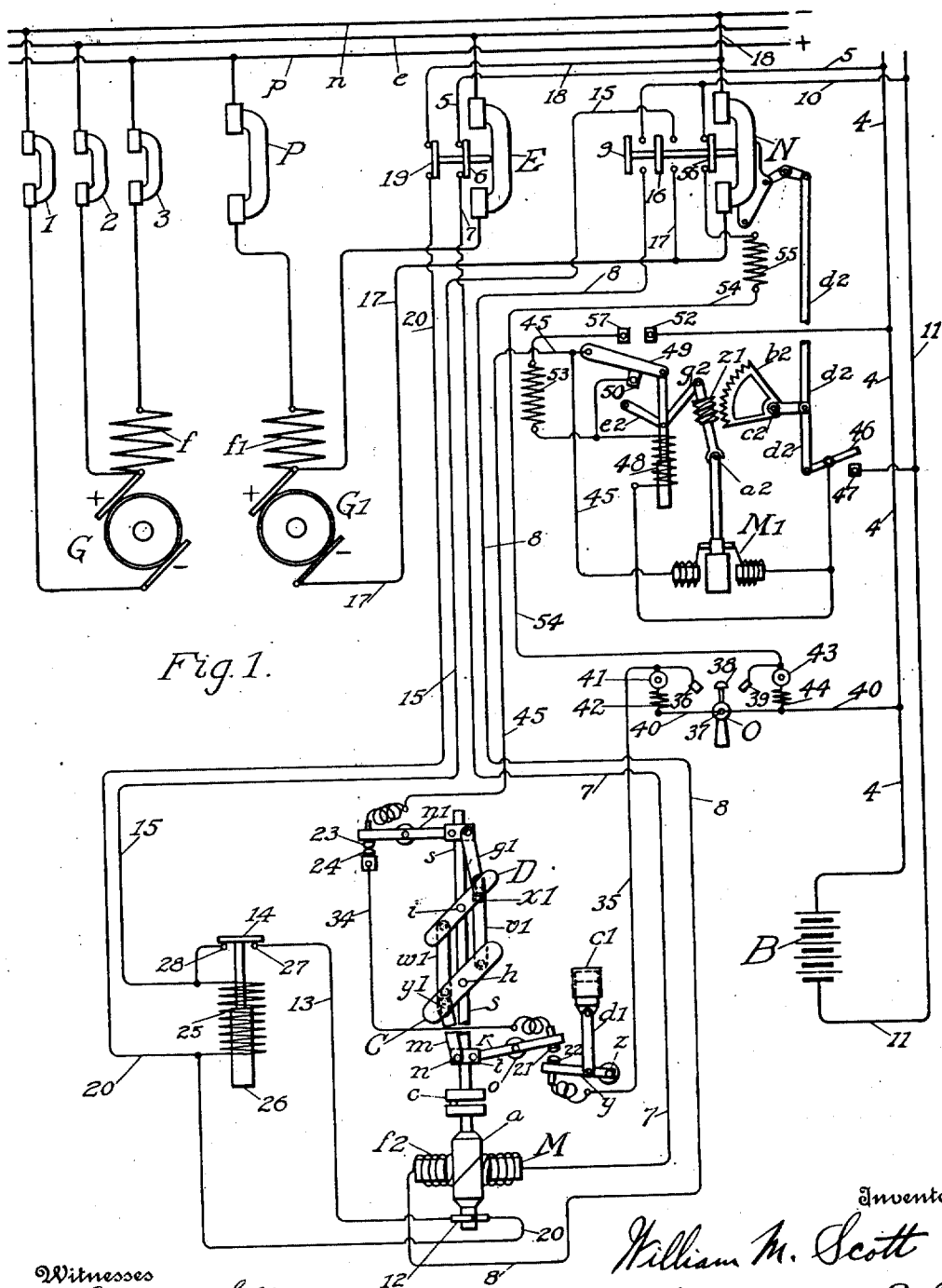
Figure 1 is a diagrammatic view of circuit arrangements and apparatus embodying my invention.

Fig. 2ª is a front elevational view of the switching mechanism shown in Fig. 6.

Fig. 3 is a horizontal sectional view, partly in plan, illustrating an example of a clutch which may be employed.

Fig. 4 is a side elevational view of mechanism shown in Fig. 2.

Fig. 5 is a view, partly in section, of a gyrostat when the plane of the latter is at right angles to its driving shaft.

Fig. 6 is a vertical sectional view, partly in side elevation, of an electro-magnetically controlled switch.

Referring to Fig. 1, $p$, $n$ and $e$ are, respectively, positive, negative and equalizer buses with which is connected a compound wound generator G through the switches or automatic circuit breakers represented at 1, 2 and 3. The series field winding of the generator G is indicated at $f$, the shunt field winding being omitted.

$G^1$, whose series field winding is $f^1$ and whose shunt field winding is omitted, is to operate in parallel with the generator G and is connected to the bus bars by the main switches or automatic circuit breakers P, E and N. The positive and equalizer breakers P and E may be moved to their circuit closing positions by hand or by motive power, as in the case of the negative breaker N, the motive controls for the breakers P and E being omitted for the sake of clearness, as also are their overload or other trip coils and latches.

The negative breaker N is also held closed by a latch, not shown, which may be tripped by an overload coil, as well understood in the art of automatic circuit breakers, or by an additional trip coil hereinafter referred to. With the generator G or a plurality of generators in communication with the buses $p$, $n$ and $e$ through which current is delivered to the consumption circuit including electric lights, motors or other translating devices, the generator $G^1$ should not be brought into communication with the bus bars by the breakers P, E and N unless the voltage of the generator $G^1$ bears a proper relation to the voltage of the bus bars. If this proper relation does not exist serious disturbance to the circuits, generators and their prime motors will result, and this proper voltage relation is of particularly great importance where the generators involved are of very large capacity and where continuity of service is of great importance.

The incoming generator $G^1$ is switched into circuit by first closing the equalizer breaker E, as by hand or motive power and thereafter the positive breaker P is closed by hand or motive power. But the operation is not completed until the negative breaker N is closed and its closure is prevented until the proper voltage relation above referred to obtains.

The means for preventing the closure of the breaker N are the following:

Upon closure of the equalizer breaker E the field $f^2$ of the motor M is excited by current from the battery or other source of current B flowing through conductor 4, conductor 5, switch 6, which is closed when the breaker E is closed, conductor 7, field $f^2$, conductor 8, switch 9, which is closed when the breaker N is open, which it still is at the time under consideration, conductor 10, and conductor 11 to the other terminal of the source B. Simultaneously the armature $a$ of the motor M is in a closed circuit which may be traced from a brush or armature terminal 12 through conductor 13, switch 14, conductor 15, switch 16 which is closed when the breaker N is open, conductor 17 to the negative brush of the armature of the generator $G^1$ through the armature, series field $f^1$, positive breaker P, positive bus $p$, through the generator G to the negative bus $n$, conductor 18, switch 19, which is closed when the equalizer breaker E is closed, conductor 20, to the remaining brush of armature $a$. The result is that the circuit including the armature $a$ of motor M is subjected to an effective voltage which is the difference between the voltages of the bus bars and of the incoming generator $G^1$. Accordingly, the armature $a$ rotates at a speed proportional to this voltage difference. And the direction of rotation of the armature $a$ depends upon which voltage is the higher, that of the generator $G^1$ or that of the bus bars.

To prevent the incoming generator $G^1$ from taking current from the bus bars and thereby operating as a motor and further to insure the generator $G^1$ taking some of the bus bar load immediately it is switched in, its voltage is adjusted, by the usual shunt field rheostat, to a value exceeding the bus bar voltage. This insures, as above stated, that the armature $a$ will run in a certain direction and at a speed proportional to the difference in voltage between bus bars and generator $G^1$.

The armature $a$ is connected through clutch $c$ to a shaft $s$ which will be rotated by the armature $a$ only when that armature is rotating in a predetermined direction. Should the armature rotate in opposite direction due to predominance of bus bar voltage over the voltage of the generator $G^1$ the shaft $s$ will remain at rest, because the clutch is of a type to transmit motion in one direction only. For this purpose any suitable clutch mechanism may be employed, that herein illustrated comprising, as shown in Figs. 2 and 3, the driving member $b$ secured upon the shaft of the armature $a$ and the driven member $d$ secured to the shaft $s$, the balls $g$ serving as a driving connection between the members $b$ and $d$ when the rotation is in the direction of the arrow, Fig. 3; and when the direction of rotation of the member $b$ is counter to that indicated by the arrow, the balls will recede into the pockets in the member $b$, and the member $d$ will remain stationary. This type of clutch is well known and is not, per se, a part of my invention.

The vertical shaft $s$ has pivoted thereto at $h$ and $i$ the gyroscopic governor members C and D, shown in the form of rings. Their planes are normally inclined to the shaft $s$, as indicated in Figs. 1, 2 and 4, but upon rotation of the shaft $s$ rings C and D move upon their pivots $h$ and $i$ toward a position at right angles or normal to the shaft $s$, as indicated in Fig. 5. Movable about the pivot $h$ in fixed relation with the gyrostat ring C is an arm $j$, Fig. 2, to one end of which there is pivoted at $k$ the link $m$ pivoted at $n$ to the collar $o$ which has a loose bearing upon the shaft $s$ and is movable longitudinally of the shaft. The block $p$ has pivoted thereto at $q$ the contact carrying lever $r$ pivoted to the base of the apparatus at $t$ and carrying at its outer end the contact 21. The spiral spring $u$ has its one end connected to the vertically adjustable pin $v$ by which the tension of the spring may be adjusted. The lower end of the spring $u$ is connected to the block $w$ which is adjustable longitudinally of the arm $r$ by the screw $x$. The contact 21 is adapted to engage the contact 22 carried upon the arm $y$ pivoted to the base of the apparatus at $z$ and having attached thereto one end of the spiral tension spring $a^1$ whose other end is connected to the vertically adjustable pin $b^1$ for adjusting the tension of the spring $a^1$. A dash-pot $c^1$ has its piston connected by link $d^1$ to the pivoted lever $y$, the dash-pot retarding upward movement of the contact 22.

An arm $e^1$ moves in fixed relation with the gyrostat ring D upon the pivot $i$. A link $g^1$ is pivoted at $h^1$ to the arm $e^1$ and at its other end at $i^1$ to the collar $j^1$ which has a loose bearing upon the shaft $s$ and is capable of movement longitudinally with respect thereto. A block $k^1$ has pivoted thereto at $m^1$ one end of the contact carrying arm or lever $n^1$ pivoted to the base of the apparatus at $o^1$ and carrying at its outer end the contact 23. A spiral tension spring $p^1$ is connected at its lower end to the vertically adjustable pin $q^1$ for changing the tension of the spring $p^1$, and the upper end of the spring is connected to the block $r^1$ which is adjustable longitudinally of the arm $n^1$ by the screw $s^1$. The contact 23 is adapted to engage the stationary contact 24.

The arms $j$ and $e^1$ have pivoted thereto respectively at $t^1$ and $u^1$ the links $v^1$ and $w^1$. The link $v^1$ has at its upper end the slot $x^1$ in which engages the pivot pin $h^1$. And the link $w^1$ at its lower end has the slot $y^1$ in which engages the pin $k$.

When the shaft $s$ is vertical, as shown in the example illustrated, the force exerted by the ring D is assisted by gravity in moving the collar $j^1$ and block $k^1$ downwardly, while the force exerted by the ring C is opposed by gravity in moving the collar $o$ and the block $p$ upwardly. For these reasons it may be desirable to make the ring C heavier than D as indicated.

Returning now to Fig. 1, the solenoid winding 25 is connected across the conductors 15 and 20 which, as previously noted, are at a potential difference equal to the difference of the voltages of the bus bars and the incoming generator $G^1$. The solenoid core 26 is adapted to actuate and open the switch 14 when the winding 25 is sufficiently energized, and under normal conditions the switch bridge 14 bridges the contacts 27 and 28 which are in series with the armature $a$ of the gyro motor M.

As viewed in Figs. $2^a$ and 6, the solenoid core 26 has attached thereto a pin 29 adapted to thrust upwardly on the under side of the tail 30 of the contact carrying lever 31 pivoted at 32. The arm 31 carries the bridging contact 14 which is connected by a flexible conductor 33 to the one contact 27, while the contact 14 engages the other contact 28.

The contact 21 is shown, Fig. 1, connected by conductor 34 with the contact 24. The contact 22 is connected by conductor 35 with the contact 36 of the operator's switch O pivoted at 37 and having the movable contact 38 adapted to engage the contact 36 or the contact 39. The operator's switch contact 37 is connected by conductor 40 to the conductor 4 of the control circuit supplied by the source B. And the contact 36 is connected to the conductor 40 through the lamp 41 and resistance 42, contact 39 being similarly connected to the contact 40 through the lamp 43 and resistance 44.

The contact 23 connects through conductor 45 to one terminal of the motive device here shown as an electric motor $M^1$ whose other terminal connects to the motor control switch 46 adapted to engage contact 47 connected to the control circuit conductor 11.

The armature of the motor $M^1$ is adapted to drive the worm $z^1$ through the universal joint $a^2$, the worm adapted to engage and drive the gear segment $b^2$ to rotate the same about its pivot $c^2$ and cause its arm to actuate the vertically extending rod $d^2$ which actuates the movable bridging member of the main negative breaker N. 48 is an engaging coil or solenoid whose core actuates the toggle $e^2$, $g^2$ which actuates the worm $z^1$.

The core of the solenoid 48 also actuates the switch lever 49 connected to the conductor 45 and adapted to engage the contact 50 or bridge the contacts 51 and 52, the former of which is connected to the resistance 53 and the latter of which is connected to the control circuit conductor 4.

The operator's switch contact 39 is connected by conductor 54 to a trip coil 55 for tripping the breaker N in a well known manner. The other terminal of the coil 55 connects through switch 56 which is closed only when the breaker N is closed and whose other terminal connects by conductor 10 to the conductor 11 of the control circuit whose source of energy is B.

The operation is as follows:

The generator G is, as stated, assumed to be connected to the bus bars $p$, $n$ and $e$ through the automatic circuit breakers represented by 1, 2 and 3.

The generator $G^1$, to be thrown on to the bus bars, first has its voltage adjusted to a value higher than that existing on the bus bars. The equalizer breaker E is first closed and then the positive breaker P as before stated, leaving negative breaker N to be closed last and complete connection of generator $G^1$ with the bus bars.

The armature $a$ will now rotate at a speed proportional to the difference between the voltages on the bus bars and the generator $G^1$; and the voltage of the generator $G^1$ exceeding that on the bus bars, the armature $a$ will rotate in such direction as to transmit rotation through the clutch $c$ to the shaft $s$. Due to the rotation of the shaft $s$ the gyrostat rings C and D will tend under the influence of centrifugal force to move toward positions at right angles to the shaft $s$ and will more and more closely approach such positions as the speed of the shaft increases, and therefore as the difference between the voltages of the generator $G^1$ and the bus bars increases. These movements of the rings C and D are in clockwise direction about their pivots $h$ and $i$, as viewed in Fig. 1. This movement of the lower ring C pulls upwardly on the link $m$, thereby causing a pivotal movement of the contact lever $r$ in clockwise direction about its pivot $t$ to move the contact 21 downwardly; and the movement of the ring D pulls downwardly upon the link $g^1$ tending to separate the contact 23 from the contact 24. As shown in Fig. 1, under normal conditions, the "high speed" contacts 23 and 24 are closed or in engagement with each other, while the "low speed" contacts 21 and 22 are normally separated or open.

As will hereinafter appear the motor $M^1$ for closing the negative breaker N cannot be energized unless the "low speed" switch 21, 22 and the "high speed" switch 23, 24 are simultaneously closed.

When the voltage difference between the generator $G^1$ and the bus bars is below a predetermined value, the speed of the shaft $s$ will be insufficient to cause the gyrostat ring C to move sufficiently to close the low speed switch and at such speed the high speed switch remains closed. Under these conditions the motor $M^1$ cannot be energized.

With a difference of voltage between generator $G^1$ and the bus bars of greater value and of a value lying between certain predetermined minimum and maximum values, the shaft $s$ will rotate at higher speed with consequent greater movement on the part of the ring C sufficient to close the low speed switch, the speed being however insufficient to cause an opening of the high speed switch. Under these circumstances the motor $M^1$ may be energized and the breaker N closed.

When the shaft $s$ attains a speed sufficient to close the low speed switch, the ring C will have moved far enough to overcome the lost motion at the slots $x^1$ and $y^1$ and cause the rings C and D to move as a unit at all higher speeds and coöperate to open the high speed switch if the speed increases a further predetermined amount. And if the speed of the shaft $s$ decreases sufficiently from a value at which the rings C and D have operated as a unit the ring C will become independent of the ring D due to the lost motion slots and may open the low speed switch before the high speed switch closes.

Should the speed of the shaft $s$ increase after contact 21 has engaged contact 22 the ring C will move still farther upon its pivot $h$ and further actuate the contact lever $r$, causing the lever $y$ to yield and so maintain the low speed switch closed during such further increase of speed.

Should the speed increase still further, due to a still greater difference in voltage, the lever $y$ will continue to yield and maintain the switch 21, 22 closed, but when the speed attains a certain predetermined maximum contact 23 will be separated from contact 24, opening the "high speed" switch, thus preventing energization of the motor $M^1$ and closure of the breaker N when the voltage difference exceeds a predetermined maximum.

For all speeds or voltage differences between a predetermined minimum and predetermined maximum both switches remain closed and for the higher part of this speed range between a predetermined minimum and predetermined maximum the lever $y$ has been depressed by the lever $r$. If the voltage difference or shaft speed exceeds a predetermined maximum the "high speed" switch is opened as stated, and the lever $y$ is still depressed and to even greater extent by the lever $r$. Should the voltage difference now suddenly fall the speed of the shaft $s$ decreases and the "high speed" switch closes and the contact 21 will be withdrawn from contact 22, so that nevertheless the motor $M^1$ cannot be energized. After the quick withdrawal of the contact 21 from contact 22 due to this fall in speed the contact 22 is prevented from following rapidly enough to maintain the "low speed" switch closed because of the retardation effected by the dash-pot $c^1$. The contact 22 is returned toward its normal position by its spring $a^1$ in opposition to the dash pot, and should the speed of the shaft $s$ not have fallen below the predetermined speed contact 22 will overtake and engage contact 21, in which case both the high and low speed switches are closed and the breaker N may be closed. It follows, therefore, that during a sudden transition in voltage the motor $M^1$ cannot be energized, but may be energized if after the transition of voltage the voltage difference lies between the predetermined minimum and maximum values.

The springs $p^1$ and $u$ calibrate the gyro apparatus and determine at what speeds of the shaft $s$ the switches controlled thereby shall operate. And the tension of the spring $a^1$ determines with what rapidity the lower contact 22 may return toward normal position in opposition to the dash-pot, the spring $a^1$ assisting spring $u$ in opposing ring C after contact 21 has engaged contact 22.

Should the voltage difference exceed the maximum to which the gyro apparatus responds by opening the "high speed" switch 23, 24, the solenoid 25 will be strongly enough energized to raise its core 26 and open the switch 14 and thereby break the circuit of the armature $a$ of the motor M and hold such circuit broken until decrease of the voltage difference to a value within the range to be taken care of by the gyro apparatus.

When the switches 21, 22 and 23, 24 are simultaneously closed under any of the circumstances above mentioned, the operator may cause energization of the motor $M^1$ by bringing the contact 38 into engagement with contact 36, whereupon current will flow from the control source B through conductor 4, conductor 40, contacts 38 and 36, conductor 35, "low speed" switch 21, 22, conductor 34, "high speed" switch 23, 24, conductor 45, and through the motor $M^1$ and the motor switch 46, 47, which is closed when the breaker N is open, to conductor 11 of the control circuit, thereby energizing the motor $M^1$, whose armature then starts to rotate. Simultaneously with the energization of the motor $M^1$ current flows also from conductor 45 through switch 49, 50 and through the engaging coil 48, which expands the toggle $e^2$, $g^2$ to bring the now rotating worm $z^1$ into engagement with the gear segment $b^2$ rotating the latter upon its pivot $c^2$ and causing the rod $d^2$ to move the contact member of the main breaker N to closed position, where it is held in the usual way by a latch, not shown. This now completes the connection of the generator $G^1$ with the bus bars. Simultaneously with the actuation of the toggle $e^2$, $g^2$ the switch 49 is shifted away from contact 50 into engagement with contacts 51 and 52 which brings the resistance 53 into series with the engaging coil 48 which continues to hold the switch 49 in engagement with contacts 51 and 52. When in this position the operator's switch O and the "high speed" and "low speed" switches of the gyroscope control no longer have control of the motor $M^1$, since the latter now receives its current directly from the conductor 4 through contact 52 and switch blade 49. In other words, this switch 49, 52 is a localizing switch which insures that once the motor $M^1$ has been energized it will complete its cycle of operation without control either by the operator's switch O or by the gyroscopic apparatus.

When the breaker N has been moved to its closed position illustrated in Fig. 1 the motor switch 46, 47 is opened, thereby deenergizing the motor and the engaging coil 48, with the result that the parts take the position illustrated in Fig. 1.

The closure of the breaker N has closed the switch 56 controlling the circuit of the trip coil 55. Therefore after the breaker N has been closed it may be tripped by energizing the trip coil 55 by bringing the contact 38 of the operator's switch into engagement with contact 39, thereby short circuiting the lamp 43 and the resistance 44 to allow sufficient current to pass through the coil 55 to trip the breaker N. Before movement of the operator's switch contact 38 into engagement with contact 36 the lamp 41 and resistance 42 are in series in circuit with the motor $M^1$ and the lamp and resistance 42 prevent sufficient current to flow through the motor $M^1$ to energize it. But engagement with contacts 38 and 36 short circuits the lamp 41 and resistance 42 and if the gyroscopic control is in proper position, motor $M^1$ may be energized.

When the breaker N reaches closed position the switch 16 is opened, thereby breaking the circuit of the armature $a$ of the gyro motor M and the switch 9 is also opened, thereby breaking the circuit of the field $f^2$ of the gyro motor. The result is that when the breaker N has been moved to closed position the gyro motor M is automatically deënergized and the gyro apparatus assumes the normal position illustrated in Fig. 1.

It will be understood that the hereinbefore described apparatus is not limitive of my invention and that the same is applicable in other or analogous arrangements; and it will be understood that a switch such as the operator's switch O may in certain applications of my invention be omitted and the conductors 40 and 35 directly connected to each other, in which case the automatic control by the high and low speed switches may be effected without regard to volition of an operator; and it will be further understood that my invention is not limited to the control of a switch operating motive device, but that the circuit including the high and low speed switches may be utilized for any other purpose; and it will be further understood that the voltage impressed upon the armature $a$ of the motor M may be that produced by any means and need not be the difference between a plurality of voltages.

And it will be further understood that as to some features of my invention the shaft $s$ may be driven by any apparatus whose speed varies and irrespective of whether or not the apparatus changes in speed in response to a voltage change; and that the motor $M^1$ may be used to drive any suitable or desired device or mechanism, or movable contact mechanism or switching mechanism of a type or for a purpose other than that of the switch or breaker N.

What I claim is:

1. The combination with sources of voltage, of switching mechanism for connecting them to each other, means for actuating said switching mechanism, means responsive to the difference between voltages of said sources controlling said means for actuating said switching mechanism, and means responsive to movement of said switching mechanism to connecting position for rendering said second named means inoperative.

2. The combination with sources of voltage, of switching mechanism, means for actuating said switching mechanism to position to connect said sources with each other, and means responsive to the difference between voltages of said sources preventing operation of said actuating means when said difference between said voltages is less than a predetermined magnitude.

3. The combination with sources of voltage, of switching mechanism, means for actuating said switching mechanism to position to connect said sources with each other, and means responsive to the difference between voltages of said sources preventing operation of said actuating means when said difference between said voltages is greater than a predetermined magnitude.

4. The combination with sources of voltage, of switching mechanism for connecting them with each other, and means responsive to the difference between voltages of said sources preventing actuation of said switching mechanism to connecting position except when said difference between said voltages is of a magnitude lying between a predetermined minimum and a predetermined maximum.

5. The combination with sources of voltage, of switching mechanism, means for actuating said switching mechanism to position to connect said sources with each other, and means preventing operation of said actuating means when the voltage of a certain of said sources predominates over the voltage of another of said sources.

6. The combination with sources of voltage, of switching mechanism, a motor whose speed is dependent upon the difference between voltages of said sources, and speed responsive means controlling said switching mechanism comprising a shaft driven by said motor, and a gyro member pivoted on said shaft and taking different angular positions with respect thereto in response to changes of said difference between said voltages.

7. The combination with sources of voltage, of switching mechanism, a motor whose speed is dependent upon the difference between voltages of said sources, speed responsive means comprising a shaft driven by said motor, a gyro member pivoted on said shaft and taking different positions with respect thereto in response to changes in said difference between said voltages, a switch actuated by said gyro member, and a motive device for actuating said switching mechanism controlled by said switch.

8. The combination with sources of voltage, of switching mechanism, a motor comprising field and armature members of which one is subjected to the difference between the voltages of said sources, whereby the speed of said motor is dependent upon said difference in said voltages, a shaft driven by said motor, a gyro member pivoted to said shaft and taking different positions with respect thereto in response to changes in said difference between said voltages, and means controlling said switching mechanism controlled by said gyro member.

9. The combination with sources of voltage, of switching mechanism, a motor whose speed is dependent upon the difference between the voltages of said sources, a shaft driven by said motor, gyro members pivoted to said shaft and taking different positions in response to changes in difference between said voltages, a motive device controlling said switching mechanism, and switches connected in series with each other controlling said motive device and controlled by said gyro members.

10. The combination with sources of voltage, of speed responsive means, means responsive to the difference between voltages of said sources controlling said speed responsive means, and means preventing said means responsive to difference between said voltages from controlling said speed responsive means when the voltage of a certain of said sources is exceeded by the voltage of another of said sources.

11. The combination with sources of voltage, of a motor whose speed is dependent upon the difference between voltages of said sources, a member driven by said motor and changing its position in response to changes of speed of said motor, a circuit controlled by said member, and switching mechanism controlling connection between said sources controlled by said circuit.

12. The combination with sources of voltage, of a motor whose speed is dependent upon the difference between the voltages of said sources, a plurality of members driven by said motor and changing their positions in response to changes in said difference between said voltages, a switch controlled by each of said members, and a circuit in which said switches are connected in series with each other.

13. The combination with sources of voltage, of a motor whose speed is dependent upon the difference between the voltages of said sources, a plurality of members driven by said motor and changing their positions in response to changes in said difference between said voltages, normally open and closed switches controlled by said members, and a circuit in which said switches are connected in series with each other.

14. The combination with sources of voltage, of a motor whose speed is dependent upon the difference between voltages of said sources, a member driven by said motor and changing its position in response to changes of speed of said motor, a circuit, a normally closed switch in said circuit opened by said member when the speed of said motor exceeds a predetermined value, and switching mechanism controlling connection between said sources and controlled by said circuit.

15. The combination with sources of voltage, of a motor whose speed is dependent upon the difference between voltages of said sources, a member driven by said motor and changing its position in response to changes of speed of said motor, a circuit, a normally open switch controlling said circuit closed by said member when the speed of said motor exceeds a predetermined value, and switching mechanism controlling connection between said sources and controlled by said circuit.

16. The combination with sources of voltage, of a motor whose speed is dependent upon the difference between voltages of said sources, a plurality of members driven by said motor and changing their positions in response to changes of speed of said motor, a switch controlled by each of said members, one of said switches responsive to predetermined motor speed and another of said switches responsive to motor speed higher than said predetermined motor speed.

17. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches being opened in response to another motor speed.

18. The combination with sources of voltage, of a motor whose speed is dependent upon the difference between the voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches being opened in response to a predetermined increase of motor speed above said predetermined speed.

19. The combination with sources of voltage, of a motor whose speed is dependent upon the difference between voltages of said sources, a plurality of members driven by said motor and changing their positions in response to changes of speed of said motor, a switch controlled by each of said members, one of said switches responsive to predetermined motor speed and another of said switches responsive to motor speed higher than said predetermined motor speed, said switches connected in series with each other, and a circuit controlled by said switches.

20. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches opened in response to another motor speed, said switches connected in series with each other, and a circuit controlled by said switches.

21. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches being opened in response to a predetermined increase of motor speed above said predetermined speed, said switches connected in series with each other, and a circuit controlled by said switches.

22. The combination with sources of voltage, of a motor whose speed is dependent upon the difference between voltages of said sources, a plurality of members driven by said motor and changing their positions in response to changes of speed of said motor, a switch controlled by each of said members, one of said switches responsive to predetermined motor speed and another of said switches responsive to motor speed higher than said predetermined motor speed, said switches connected in series with each other, a circuit controlled by said switches, and switching mechanism controlling connection between said sources controlled by said circuit.

23. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches opened in response to another motor speed, said switches connected in series with each other, a circuit controlled by said switches, and switching mechanism controlling connection between said sources controlled by said circuit.

24. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches being opened in response to a predetermined increase of motor speed above said predetermined speed, said switches connected in series with each other, a circuit controlled by said switches, and switching mechanism controlling connection between said sources controlled by said circuit.

25. The combination with sources of voltage, of a motor whose speed is dependent upon the difference between voltages of said sources, a plurality of members driven by said motor and changing their positions in response to changes of speed of said motor, a switch controlled by each of said members, one of said switches responsive to predetermined motor speed and another of said switches responsive to motor speed higher than said predetermined motor speed, said switches connected in series with each other, a circuit controlled by said switches, a motive device controlled by said circuit, and switching mechanism actuated by said motive device.

26. The combination with sources of voltage, of a motor whose speed is dependent upon the difference between voltages of said sources, a plurality of members driven by said motor and changing their positions in response to changes of speed of said motor, a switch controlled by each of said members, one of said switches responsive to predetermined motor speed and another of said switches responsive to motor speed higher than said predetermined motor speed, said switches connected in series with each other, a circuit controlled by said switches, a motive device controlled by said circuit, and switching mechanism controlling connection between said sources actuated by said motive device.

27. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches opened in response to another motor speed, said switches connected in series with each other, a circuit controlled by said switches, a motive device controlled by said circuit, and switching mechanism actuated by said motive device.

28. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches opened in response to another motor speed, said switches connected in series with each other, a circuit controlled by said switches, a motive device controlled by said circuit, and switching mechanism actuated by said motive device.

29. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches being opened in response to a predetermined increase of motor speed above said predetermined speed, said switches connected in series with each other, a circuit controlled by said switches, a motive device controlled by said circuit, and switching mechanism actuated by said motive device.

30. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches being opened in response to a predetermined increase of motor speed above said predetermined speed, said switches connected in series with each other, a circuit controlled by said switches, a motive device controlled by said circuit, and switching mechanism controlling connection between said sources actuated by said motive device.

31. The combination with sources of voltage, of a motor whose speed is dependent upon the difference between voltages of said sources, a plurality of members driven by said motor and changing their positions in response to changes of speed of said motor, a switch controlled by each of said members, one of said switches responsive to motor speed higher and another of said switches responsive to motor speed lower than predetermined motor speed, and a lost motion connection between said motor driven members.

32. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches opened in response to another motor speed, and a lost motion connection between said motor driven members.

33. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches being opened in response to a predetermined increase of motor speed above said predetermined speed, and a lost motion connection between said motor driven members.

34. The combination with sources of voltage, of a motor whose speed is dependent upon the difference between voltages of said sources, a plurality of members driven by said motor and changing their positions in response to changes of speed of said motor, a switch controlled by each of said members, one of said switches responsive to predetermined motor speed and another of said switches responsive to motor speed higher than said predetermined motor speed, said switches connected in series with each other, a circuit controlled by said switches, and a lost motion connection between said motor driven members.

35. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches opened in response to another motor speed, said switches connected in series with each other, a circuit controlled by said switches, and a lost motion connection between said motor driven members.

36. The combination with sources of voltage, of a motor whose speed is dependent upon the difference between voltages of said sources, a plurality of members driven by said motor and changing their positions in response to changes of speed of said motor, a normally open switch controlled by one of said members, a normally closed switch controlled by another of said members, said first named switch being closed in response to predetermined motor speed and the other of said switches being opened in response to a predetermined increase of motor speed above said predetermined speed, said switches connected in series with each other, a circuit controlled by said switches, and a lost motion connection between said motor driven members.

37. The combination with sources of voltage, of a motor whose speed is dependent upon the difference between the voltages of said sources, a member driven by said motor and changing its position in response to changes of speed of said motor, and a mechanical connection between said motor and said member driving said member only when said motor rotates in a predetermined direction.

38. The combination with sources of voltage, of a motor whose speed is dependent upon the difference between the voltages of said sources, a member driven by said motor and changing its position in response to changes of speed of said motor, a circuit controlled by said member, switching mechanism controlled by said circuit, and a mechanical connection between said motor and said member driving said member only when said motor rotates in a predetermined direction.

39. The combination with switching mechanism comprising a plurality of movable contact members operable independently of each other to normal position, of speed responsive means controlling operation of one of said members, a motor driving said speed responsive means, and switches controlling said motor operated in unison with said contact members, one of said motor control switches being closed when one of said contact members is in normal position and another of said motor control switches being open when another of said contact members is in normal position.

40. The combination with switching mechanism comprising a plurality of movable contact members operable independently of each other to normal position, of speed responsive means controlling operation of one of said contact members, a motor driving said speed responsive means, motor field and armature switches operating in unison with one of said contact members and closed when said contact member is in normal position, and motor armature and field switches operating in unison with the contact member whose operation is controlled by said speed responsive means and opened when said last named contact member occupies normal position.

41. The combination with sources of voltage, of switching mechanism for connecting them together comprising a plurality of movable contact members operable independently of each other, speed responsive means controlling operation of one of said contact members, a motor whose speed is dependent upon the difference between voltages of said sources driving said speed responsive means, and motor control switches occupying open and closed positions respectively when said contact members are in normal position.

42. The combination with speed responsive means, of means for driving the same, a circuit controlled by said speed responsive means, a translating device, a localizing switch controlled by said circuit and controlling said translating device, said switch transferring said translating device from control by said circuit to a circuit independent of control by said circuit.

43. The combination with speed responsive means, of means for driving the same, a circuit, a switch controlling said circuit controlled by said speed responsive means, a translating device, and a localizing switch controlled by said circuit transferring said translating device from control by said first named switch to a circuit independent of control by said first named switch.

44. The combination with speed responsive means, of means for driving the same, a circuit, a switch controlling said circuit controlled by said speed responsive means, a translating device, and a localizing switch controlled by said circuit transferring said translating device from control of said first named switch to a circuit independent of control by said first named switch, said first named switch being closed when said speed responsive means is driven at or above a predetermined speed.

45. The combination with speed responsive means, of means for driving the same, a circuit, a switch controlling said circuit controlled by said speed responsive means, a translating device, and a localizing switch controlled by said circuit transferring said translating device from control of said first named switch to a circuit independent of control by said first named switch, said first named switch being opened when said speed responsive means operates at or above a predetermined speed.

46. The combination with speed responsive means, of means for driving the same, switches closed and opened respectively by the same at different speeds, a circuit controlled by said switches, a translating device, and a localizing switch controlled by said circuit transferring control of said translating device from said first named switches to a circuit independent of control of said switches.

47. The combination with speed responsive means, of means for driving the same, a plurality of control switches connected in series with each other controlled by said speed responsive means, a circuit controlled by said switches, a translating device, and a localizing switch controlled by said circuit transferring control of said translating device from said control switches to a circuit independent of control by said control switches.

48. The combination with speed responsive means, of means for driving the same, a plurality of control switches connected in series with each other controlled by said speed responsive means, a circuit controlled by said switches, a translating device, and a localizing switch controlled by said circuit transferring control of said translating device from said control switches to a circuit independent of control by said control switches, said control switches being simultaneously closed for speeds of said speed responsive means lying between a predetermined minimum and maximum speeds.

49. The combination with speed responsive means, of means for driving the same, a circuit, a switch controlling said circuit controlled by said speed responsive means, an operator's switch controlling said circuit, a translating device, and a localizing switch controlled by said circuit transferring said translating device from control by said first named switch and said operator's switch to a circuit independent of their control.

50. The combination with speed responsive means, of means for driving the same, switches in series with each other closed and opened respectively at different speeds by said speed responsive means, an operator's switch, a circuit controlled by said first named switches and by said operator's switch, a translating device, and a localizing switch controlled by said circuit transferring control of said translating device from said first named switches and said operator's switch to a circuit independent of their control.

51. The combination with speed responsive means, of means for driving the same, switches connected in series with each other actuated at different speeds of said speed responsive means, a circuit controlled by said switches, said switches occupying similar positions through a range of speeds between predetermined minimum and maximum speeds, an operator's switch in series with said switches, switching mechanism, and a motor in said circuit for actuating said switching mechanism.

52. The combination with a translating device, of an operator's switch for controlling the same, a motor, and speed responsive means driven by said motor preventing control of said translating device by said operator's switch at a predetermined speed.

53. The combination with a translating device, of an operator's switch for controlling the same, a motor, and speed responsive means driven by said motor preventing control of said translating device by said operator's switch at speeds outside of a range between predetermined minimum and maximum speeds.

54. The combination with a motor, of an operator's switch controlling the same, switching mechanism operable by said motor, a second motor, and speed responsive means driven by said second motor, preventing control of said motor by said operator's switch at a predetermined speed.

55. The combination with a motor, of an operator's switch controlling the same, switching mechanism operable by said motor, a second motor and speed responsive means driven by said second motor preventing control of said motor by said operator's switch at speeds outside of a range between predetermined minimum and maximum speeds.

56. The combination with a translating device, of an operator's switch for controlling the same, speed responsive means preventing control of said translating device by said operator's switch at a predetermined speed, a plurality of sources of voltage, and means for driving said speed responsive means at a speed depending upon the difference between voltages of said plurality of sources.

57. The combination with a motor, of an operator's switch controlling the same, switching mechanism operable by said motor, speed responsive means preventing control of said motor by said operator's switch at a predetermined speed, a plurality of sources of voltage, and means for driving said speed responsive means at a speed depending upon the difference between voltages of said plurality of sources.

58. The combination with a member driven at varying speeds and changing its position in response to changes of speed, of a contact moved by said member, a coöperating contact engaged by said first named contact at predetermined speed, said contacts remaining in engagement and moving together in response to a change in speed from said predetermined speed, and means retarding return of said second contact.

59. The combination with sources of voltage, of a motor whose speed is dependent upon the difference between voltages of said sources, a member driven by said motor and changing its position in response to changes of speed of said motor, a circuit controlled by said member, and an electro-magnetic switch responsive to said difference between said voltages controlling said motor.

60. The combination with sources of voltage, of a motor whose speed is dependent upon the difference between voltages of said sources, a member driven by said motor and changing its position in response to changes of speed of said motor, a switch actuated by said member when said member attains a predetermined speed, and an electro-magnetic switch responsive to said difference between said voltages deënergizing said motor when said voltage difference would produce a motor speed different from said predetermined speed.

In testimony whereof I have hereunto affixed my signature this 11th day of February, 1916.

WILLIAM M. SCOTT.

Copies of this patent may be obtained for five cents each, by addressing the "Commissioner of Patents, Washington, D. C."